United States Patent
Ellement

(10) Patent No.: US 9,145,091 B2
(45) Date of Patent: Sep. 29, 2015

(54) ACCESS DEVICE

(75) Inventor: Nathan John Ellement, Oakford (AU)

(73) Assignee: Barjoh Pty Ltd, Oakford, W.A. (AU)

( * ) Notice: Subject to any disclaimer, the term of this patent is extended or adjusted under 35 U.S.C. 154(b) by 1806 days.

(21) Appl. No.: 12/095,454

(22) PCT Filed: Nov. 29, 2006

(86) PCT No.: PCT/AU2006/001807
§ 371 (c)(1),
(2), (4) Date: Sep. 18, 2008

(87) PCT Pub. No.: WO2007/062464
PCT Pub. Date: Jun. 7, 2007

(65) Prior Publication Data
US 2009/0065301 A1    Mar. 12, 2009

(30) Foreign Application Priority Data

Dec. 2, 2005 (AU) ................................. 2005906765
Jun. 2, 2006 (AU) ................................. 2006903004

(51) Int. Cl.
| | |
|---|---|
| E06C 5/00 | (2006.01) |
| B60R 3/02 | (2006.01) |
| E02F 9/08 | (2006.01) |
| E06C 5/02 | (2006.01) |
| E06C 7/18 | (2006.01) |

(52) U.S. Cl.
CPC ................. *B60R 3/02* (2013.01); *E02F 9/0833* (2013.01); *E06C 5/02* (2013.01); *E06C 7/181* (2013.01)

(58) Field of Classification Search
CPC ........................................................ E06C 9/0833
USPC .................................. 182/127, 83, 85, 86, 97
See application file for complete search history.

(56) References Cited

U.S. PATENT DOCUMENTS

| | | | | | |
|---|---|---|---|---|---|
| 2,453,937 | A | * | 11/1948 | Ray | 244/129.5 |
| 2,967,584 | A | * | 1/1961 | Westerlund | 182/97 |
| 3,190,392 | A | * | 6/1965 | Ashton et al. | 182/97 |
| 3,545,567 | A | * | 12/1970 | Dohrman | 182/97 |
| 3,620,332 | A | * | 11/1971 | Bourquin | 182/108 |
| 3,656,578 | A | * | 4/1972 | Hemken | 182/20 |
| 4,217,971 | A | | 8/1980 | Rivinius | |
| 4,243,120 | A | * | 1/1981 | Pratt et al. | 182/98 |
| 4,350,358 | A | * | 9/1982 | Ferris | 280/81.1 |
| 5,813,494 | A | * | 9/1998 | Ulschmid et al. | 182/97 |
| 5,996,737 | A | * | 12/1999 | Hedley et al. | 182/127 |
| 6,029,775 | A | * | 2/2000 | Hedley et al. | 182/127 |
| 6,315,078 | B1 | * | 11/2001 | Kumher et al. | 182/127 |
| 2002/0038741 | A1 | * | 4/2002 | Krajec | 182/153 |
| 2005/0263976 | A1 | * | 12/2005 | Brockway | 280/166 |
| 2006/0070804 | A1 | * | 4/2006 | Lapke et al. | 182/127 |
| 2010/0090517 | A1 | * | 4/2010 | Kramer et al. | 299/36.1 |
| 2010/0230209 | A1 | * | 9/2010 | Hughes et al. | 182/106 |

FOREIGN PATENT DOCUMENTS

EP     1388638    2/2004

* cited by examiner

*Primary Examiner* — Alvin Chin-Shue
*Assistant Examiner* — Candace L Bradford
(74) *Attorney, Agent, or Firm* — Crawford Maunu PLLC

(57) ABSTRACT

An access system (10) for earthmoving equipment to allow a person to move from ground level to an elevated position, said access system having an access means (20) mounted to the earthmoving equipment via a pivot, and a retraction mechanism (50) therefor, said pivot allowing the access means to be retracted through a compound angle from a downwardly and outwardly deployed position to a retracted position generally adjacent and aligned beside the vehicle, the access means may be collapsible, such as with steps (30) pivotably mounted to the sides of the access means via secondary pivots (62).

26 Claims, 10 Drawing Sheets

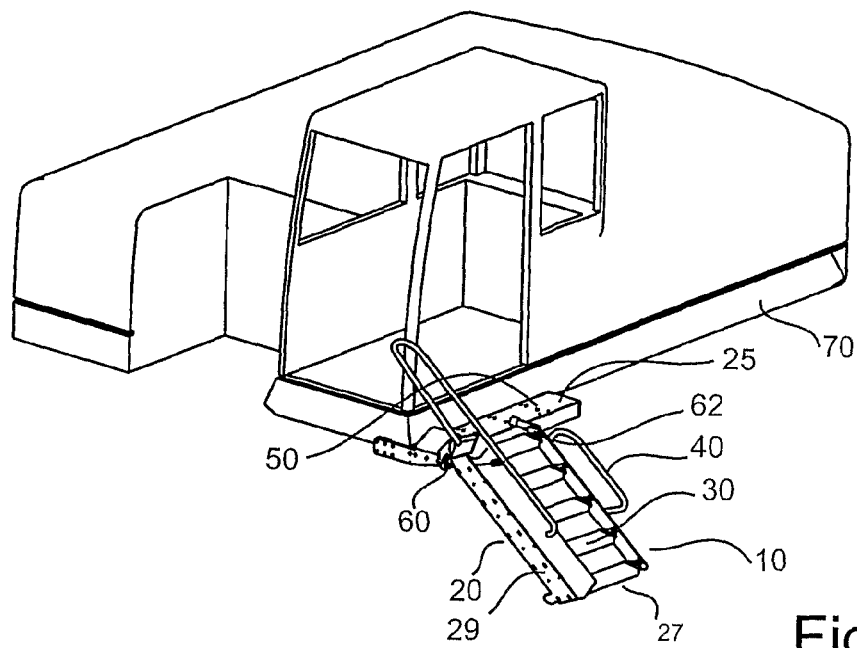
Fig 9
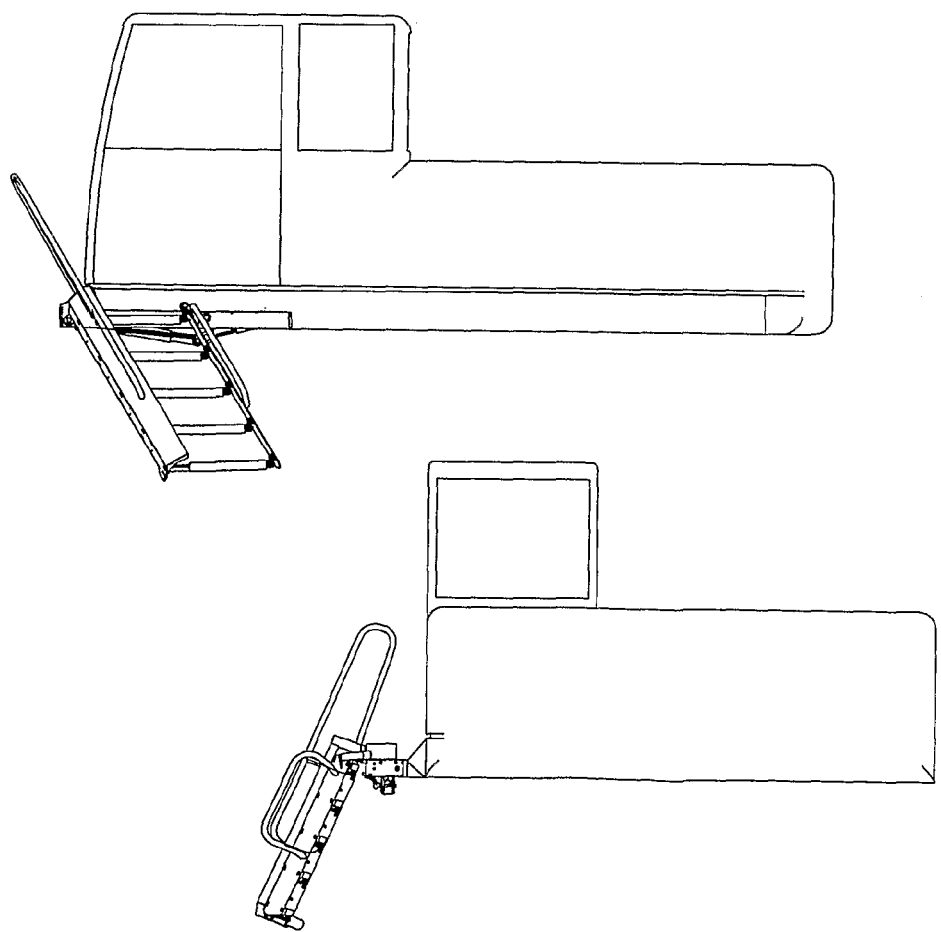

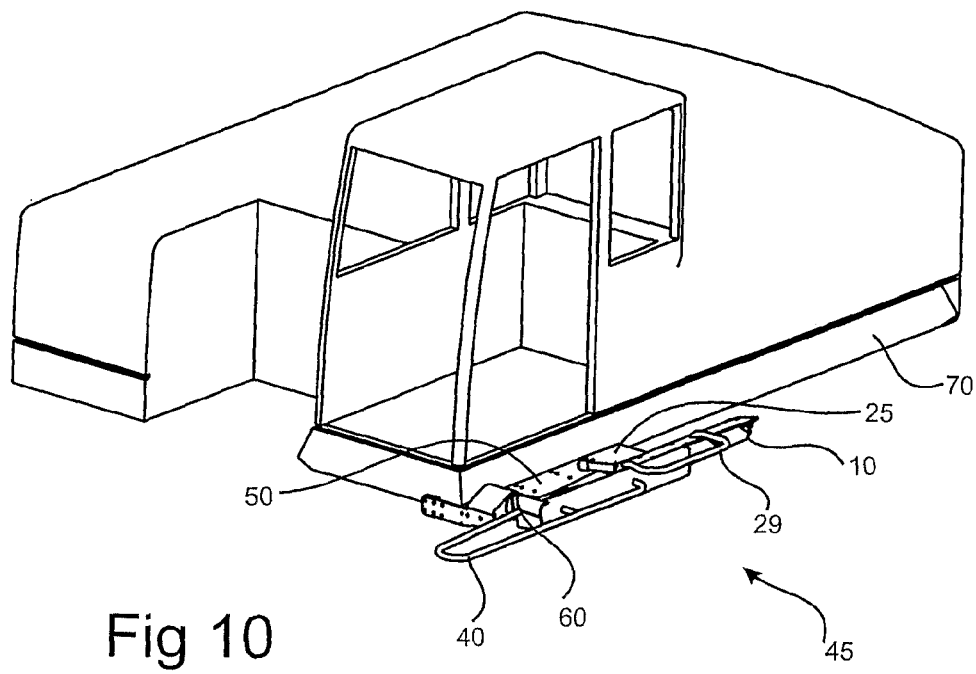
Fig 10
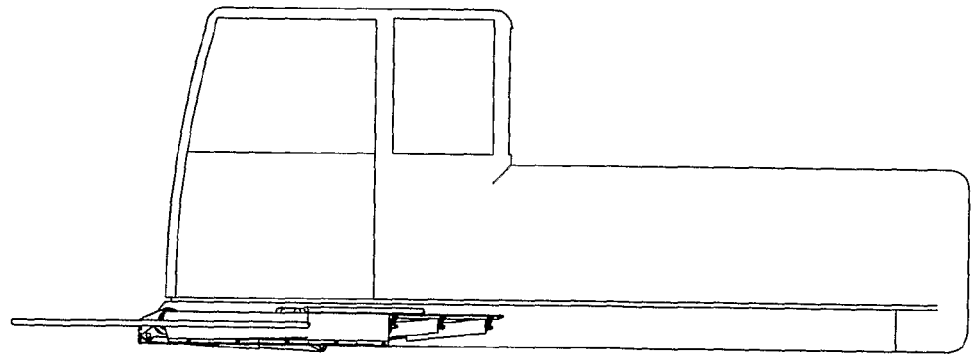
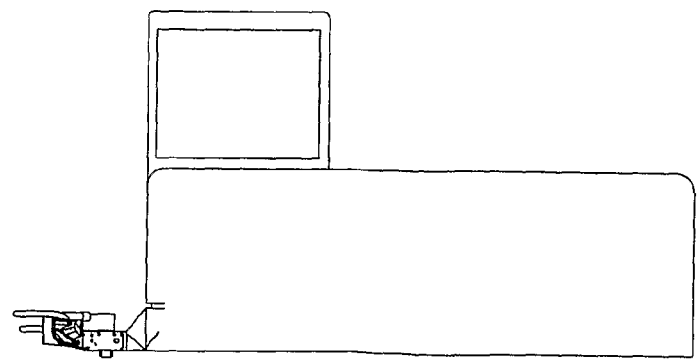

ACCESS DEVICE

RELATED PATENT DOCUMENTS

This patent application is the national stage filing under 35 U.S.C. §371 of International Application No. PCT/AU2006/001807 filed on Nov. 29, 2006; which claims foreign priority benefit under 35 U.S.C. §119/365 of Australian Patent Application No. 2005906765 filed on Dec. 2, 2005 and of Australian Patent Application No. 2006903004 filed on Jun. 2, 2006; each of these patent documents is fully incorporated herein by reference.

FIELD OF THE INVENTION

The present invention relates to access devices for earth moving equipment and in particular to a movable or retractable access device, such as a ladder or stair.

BACKGROUND OF THE INVENTION

Most earth moving equipment vehicles such as bulldozers generally includes a chassis, a variety of front-mounted blades, protective driver cabin, a hatch and a form of access or access system. The chassis includes all the mechanical parts that form the structural frame of the earth moving equipment vehicle. The driver operates the earth moving equipment vehicle from the protective driver cabin. A hatch is located behind the driver cabin and typically houses many of the important control units of the earth moving equipment vehicle such as hydraulic controls, hydraulic pump, fuse box, electrical circuit breakers etc. The form of access or access devices provides access between the ground level and the cabin. Walkways are provided around the cabin area for an operator to access the hatch located behind the driver cabin of the earth moving equipment vehicle. The access device may be attached to the walkway near the entry door to the cabin.

Retractable access systems of different configurations are presently known and have two final positions namely the deployed position and the retracted position. The major types of access devices are the vertical variable height access system and the swing access system.

The vertical variable height access system would generally be used for large excavators and earth moving equipment. In the vertical variable height access system, the ladder or stairs would be operated vertically and would remain vertical both in the deployed position and retracted position. In the swing access system the ladder or stairs when operated will swing up or down to reach either the retracted position or deployed position respectively.

The basic constituents of any access system include a ladder or stairs and a mechanism to actuate the ladder or stairs. The ladder or stairs are generally made of metal such as steel or aluminium. The movement of the ladder or stairs in any access system is controlled by an actuator mechanism. The actuator mechanism moves the ladder or stairs between the deployed and the retracted position. This actuator is usually operated either mechanically or hydraulically. The combination of both means is also in practice.

As mentioned earlier the walkways allow an operator to gain access to the driver cabin and the hatch located behind the cabin. The access device is attached to the walkway; therefore the walkway must carry the weight of the access device. Consequently, the walkway must be built stronger to take the weight of the access device. This results in the requirement for wider walkways which possess the major problem of space management. The wider walkways also mean that the weight of the walkway and access device exert a large lever on the side of the equipment. Most equipment has been designed to reduce weight and increase efficiency and is constructed as light as possible, the addition of a walkway and access ladder can damage the structure of the equipment.

In earth moving equipment, the ladder or stairs possess a problem of access management near the hatch area. The two major members of the ladder (the two lengthy vertical stiles and a number of horizontal rungs) when in a retracted position can block access to the hatch of the earth moving equipment vehicle. If any of the control units in the hatch area break down, trouble shooting is difficult until the access system is in a deployed position.

As mentioned, actuator systems of the access system are generally housed in the hatch of the vehicle and in situations wherein the actuator mechanism of the access systems fails, the operator has restricted or no access to the hatch. Hence the operator has to attend to the problem by removing the ladder mechanically, which adds to the down time of the vehicle.

The access device can be electrically powered or powered by a separate hydraulic system and hence requires an equipment cabinet in close proximity to the access device. The location of the equipment cabinet in close proximity to the access device adds to the space management problem.

SUMMARY OF INVENTION

With the aforementioned in mind, according to one aspect the present invention provides an access system for an earthmoving equipment to allow a person to move from ground level to an elevated position, said access system having a retraction mechanism rotating about a said pivot allowing movement in two dimensions said pivot being adapted to allow the access ladder to be retracted from a deployed position 90° to the direction of movement of the earthmoving equipment and at an angle to the ground to a retracted position being parallel to the direction and movement of the earthmoving equipment thus, minimizing the overhang of the ladder beyond the extremes of the earthmoving apparatus when retracted.

A further aspect provides an access system for an earthmoving equipment to allow a person to move from ground level to an elevated position, said access system including an access means and a retraction mechanism to retract the access means about a pivot allowing movement in two dimensions, said pivot allowing the access ladder to be retracted through a compound angle from a deployed position generally 90° relative to the direction of movement of the earthmoving equipment and at a downward incline with respect to the ground, to a retraced position being generally parallel to the direction of movement of the earthmoving equipment thereby reducing the overhang of the ladder beyond the extremes of the earthmoving apparatus when retracted. Thus, advantageously, one or more forms of the present invention enables a vehicle access means, such as a ladder, to be pivotably retracted from a deployed position extending from a height downwardly and outwardly of the vehicle to a retracted position in line with and adjacent the vehicle. Consequently, the access means, which when deployed extends downwardly and outwardly from the vehicle is conveniently retracted through a compound angle to a safe position beside the vehicle, and reduces risk of the retracted access means being damaged when the vehicle is moving but, when deployed, allows the vehicle operator or other person to safely access or leave the vehicle away from vehicle parts and wheels without needing to use a vertical ladder. The downwardly and outwardly inclined deployed access means permits easier, safer access to and from the vehicle in being less steep than a vertical access ladder, thereby allowing a user to walk up rather than vertically climb the access means.

A still further aspect of the present invention provides an access system for earthmoving equipment, the system including access means mounted to the equipment via at least one pivot, and an access means retraction mechanism arranged to retract the access means from a deployed position to a retracted position by pivoting the access means about at least one said pivot, the access means including spaced elongate members and at least one foot support extending therebetween, wherein said at least one foot support is pivotably mounted to the elongate members, and wherein the access means collapses with the elongate members closing relative to one another by relative pivoting with respect to the at least one foot support when pivoted to a retracted position, Advantageously, collapsing the access means thereby reduces the overall height and space occupied by the access means when retracted. This can allow the access means to be fitted outside of the cabin door while still enabling the cabin door to be opened or closed with access system in any position.

Preferably the access means may include a ladder, with one or more rungs providing the at least one foot support extending between the elongate rails of the ladder. Alternatively, the access means may be stairs with one or more steps extending between side members and providing the at least one foot support.

Preferably, the rungs/steps and side members/rails may be arranged so as to overlay each other in the retracted position. More preferably the steps and side members/rails may overlay each other when retracted to a generally horizontal position.

In one or more further embodiments, the access system may include secondary pivots between the rung(s)/step(s) and elongate side members/rails which enhances collapsibility of the ladder when retracted.

A further aspect provides an access system for an earthmoving equipment to allow a person to move from ground level to an elevated position, said access system having a ladder or steps and a retraction mechanism therefor, said pivot allowing the access ladder or steps to be retracted through a compound angle from a deployed position to a retracted position.

Preferably the ladder or steps may include side beams and at least one rung or step, wherein, in a retracted and collapsed position, said rung(s) or step(s) and the side beams are constructed so as to overlay each other.

Thus, the overall dimensions and space occupied by the ladder when retracted are reduced.

Preferably the access means retracts from a generally upright deployed position through to a generally horizontal retracted position, such as retraction through approximately 90° from a generally upright deployed position. More preferably, retraction is through a compound angle, whereby the access means extends outwards at a lower end thereof when deployed, and the lower end swings/pivots towards the equipment to the retracted position.

Preferably deployment is a reversal of one or more of the retraction arrangements.

A further aspect provides a method of retracting an access means for earthmoving equipment, including the step of; rotating an access ladder or steps about a pivot point from an outwardly and downwardly extending position with respect to at least part of the vehicle to a retracted position with the access ladder or steps substantially adjacent and aligned with respect to the earth moving equipment.

The method may advantageously include the step of collapsing the access ladder or steps in width between deployed and retracted positions.

Preferably the step of collapsing the ladder or steps further includes bringing the elongate side members closer together and pivoting the at least one foot support relative thereto such that the elongate side members overlay the at least one foot support when in the retracted position. More preferably the step of collapsing the ladder or steps further includes pivoting the at least one foot support with respect to the elongate side members using secondary pivot means attaching the respective at least one foot support to each elongate side member.

BRIEF DESCRIPTION OF THE DRAWINGS

The following figures explain the preferred embodiments of the inventions

FIG. 9 illustrates an embodiment of the collapsible access device swinging back to a partially retracted position along with the outline of the earth moving equipment.

FIG. 10 illustrates an embodiment of the collapsible access device in retracted position along with the outline of the earth moving equipment.

DETAILED DESCRIPTION OF THE INVENTION

It will now be convenient to describe the present invention with reference to the accompanying figures. The figures show a preferred embodiment of the present invention and it would be apparent to a person skilled in the art that modifications and adaptations are possible that fall within the scope of the present invention.

Figure 1:
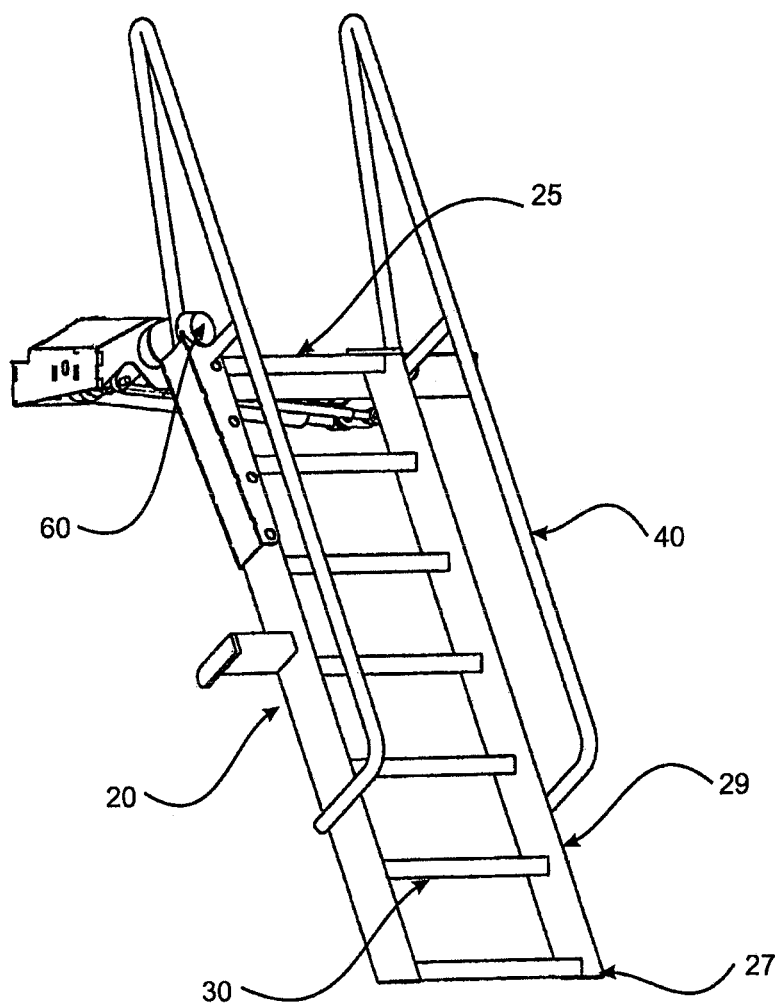
FIG. 1 illustrates the access device in deployed position.

Referring now to FIG. 1, there is shown an overview of the access device (10). The access device consists of a ladder (20) with a series of rungs (30). The ladder also has a pair of handrails (40) to assist the user in steadying themselves when using the access device (10).

In FIG. 1 the access device (10) is in a deployed position with upper end (25) of the access device (10) adjacent to the cabin (not shown) and lower end (27) near the ground level. The access device (10) is made up of a ladder (20), a pivot (60), and mechanism (80) to actuate the access device (10).

The ladder (20) is made up of long members (29) and interconnected by a number of rungs (30). The actuating mechanism moves the ladder (20) between a deployed position allowing an operator easy access to the ladder (20) and a retracted position locating the ladder (20) in a location inside the extremes of the equipment and not accessible from the ground.

The access device (10) is used in applications where an operator needs to reach the cabin, on a piece of equipment, where the cabin is located some distance off the ground. The operator will therefore approach a piece of earthmoving equipment with the access device (10) in a deployed position as shown in FIG. 1 and walk up the rungs (30) to an elevated platform adjacent to the operating cabin of the earthmoving equipment.

The use of inclined access devices are required as under modern safety requirements, it is not desirable to use vertical access systems to gain entry to an elevated cabin. The chances of falling from a vertical access system are significantly greater than when using an inclined ladder or a staircase (access device (10)).

Once the operator has entered the cabin and is about to operate the earthmoving equipment, the access device (10) must be moved from the deployed position to a retracted position. Having an access device (10) extending beyond the side of the earthmoving equipment raises many dangers. These dangers include not only the possibility of a person attempting to board the access device (10) while the equipment is in motion but there is also the possibility of impacting the extended access device (10) into the walls of the quarry or having the access device (10) run into some other fixed object.

When an operator of a machine is involved in the primary job of moving earth, they are often fully task loaded and therefore do not need the extra considerations of managing access to their machine.

The access device (10) is retracted by rotating about a pivot (60). In this application the pivot (60) has been set up in such a way as to provide rotation in two dimensions. If the pivot (60) was merely horizontal and the access device (10) rotated around that point, the access device (10) would rotate about the pivot (60) and then be pointing out from the machine when retracted. By having the pivot (60) set up to allow the access device (10) to move in two dimensions, it allows the access device (10) to pivot (60) around a single point moving from a deployed position to a retracted position, the access device (10) when retracted is positioned parallel to the body of the earthmoving apparatus as opposed to 90° to a body of the earthmoving apparatus when the access device (10) is deployed. It was found that this two dimensional motion could be achieved in a single pivot (60) without the need of complex multiple axis movement arrangements. It has been found that there is a relationship between the angle of the pivot (60), the angle of the ladder (20) and the amount of rotation required to retract the access device (10).

In the example shown in the figures, the access device (10) is at an angle of approximately 60° from the horizontal and the pivot (60) is inclined at 14° above the vertical and 14° towards the direction of rotation of the access device (10) to the retracted position. In preferred embodiments the pivot (60) of the access device (10) is inclined between 12°-30° to the horizontal direction (ground level). The pivot (60) is also inclined between 12°-30° in the direction normal to the retracting direction. This helps the ladder to make an angle of between 70 and 45 degrees to the ground.

When the access device (10) is retracted it moves from a position of being at approximately 90° to the side of the machine and at an angle of between 45° and 70° from the elevated platform (50) to the surface to a position of being parallel with the machine, with the rungs (30) running in a vertical plane thus, limiting the access to the equipment by third parties and the extent to which the access device (10) extends beyond the equipment extremes.

Figure 2:
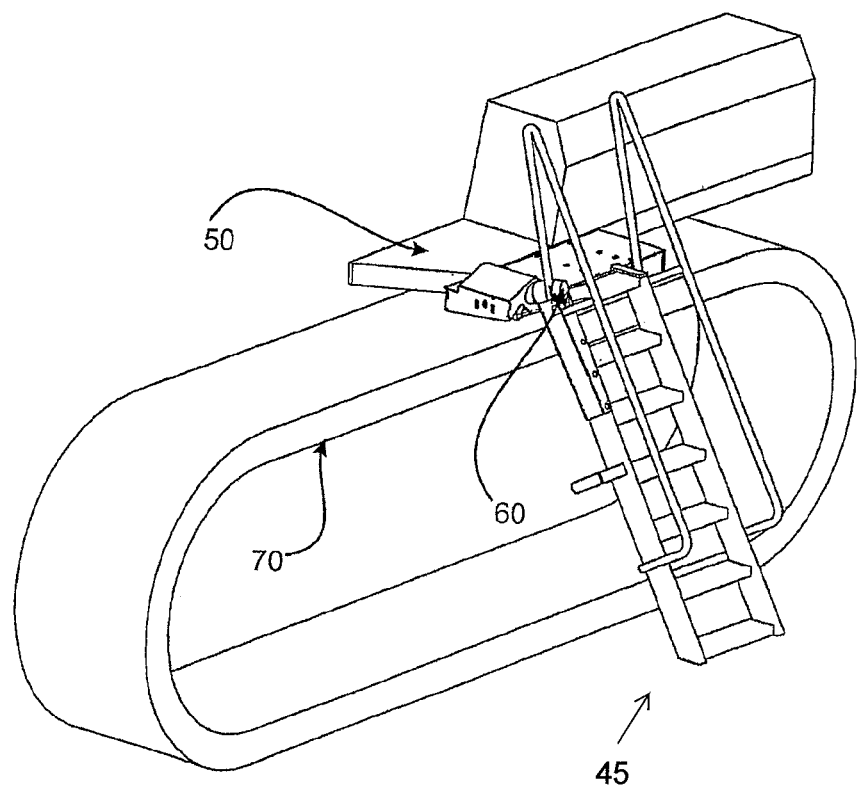
FIG. 2 illustrates the access device in a deployed position showing an outline of the tracks of a piece of earthmoving equipment.

FIG. 2 shows an example of the access device (10) with an outline of a track (70), it can be seen that the access device (10) in the fully deployed position (as shown) allows for an operator to move from the ground level (45) to an elevated platform (50) adjacent the cab of the machine.

Figure 3:
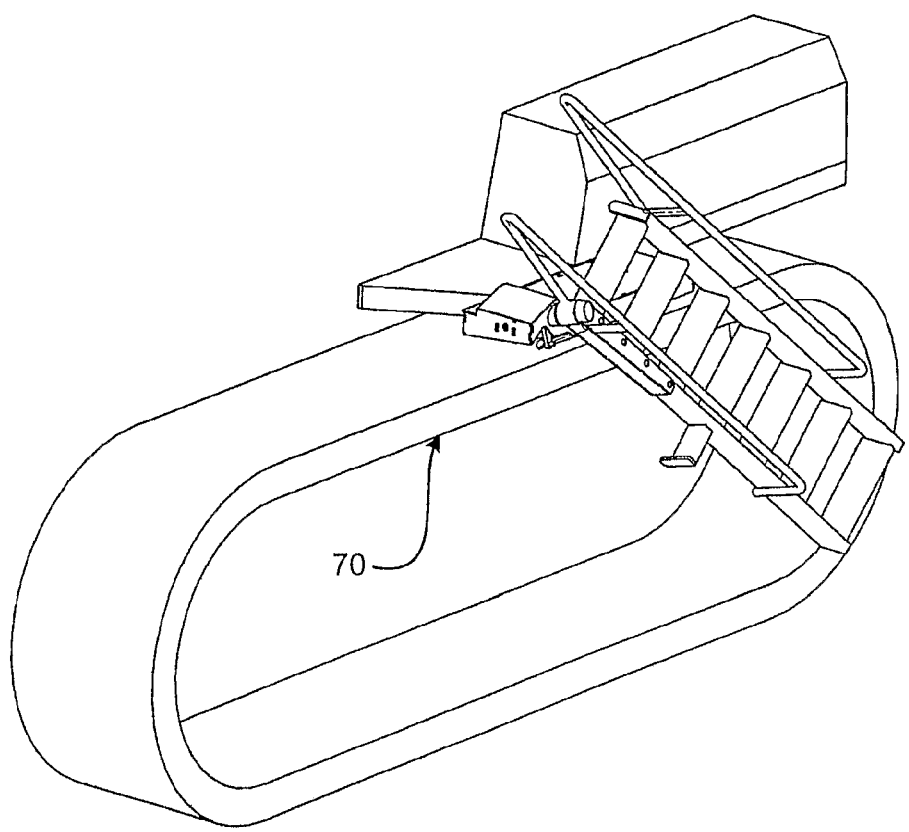
FIG. 3 illustrates the access device swinging back to a partially retracted position.

FIG. 3 shows the access device (10) in a partially retracted position and it can be seen that the access ladder is retracting in two dimensions about a single pivot (60).

Figure 4:
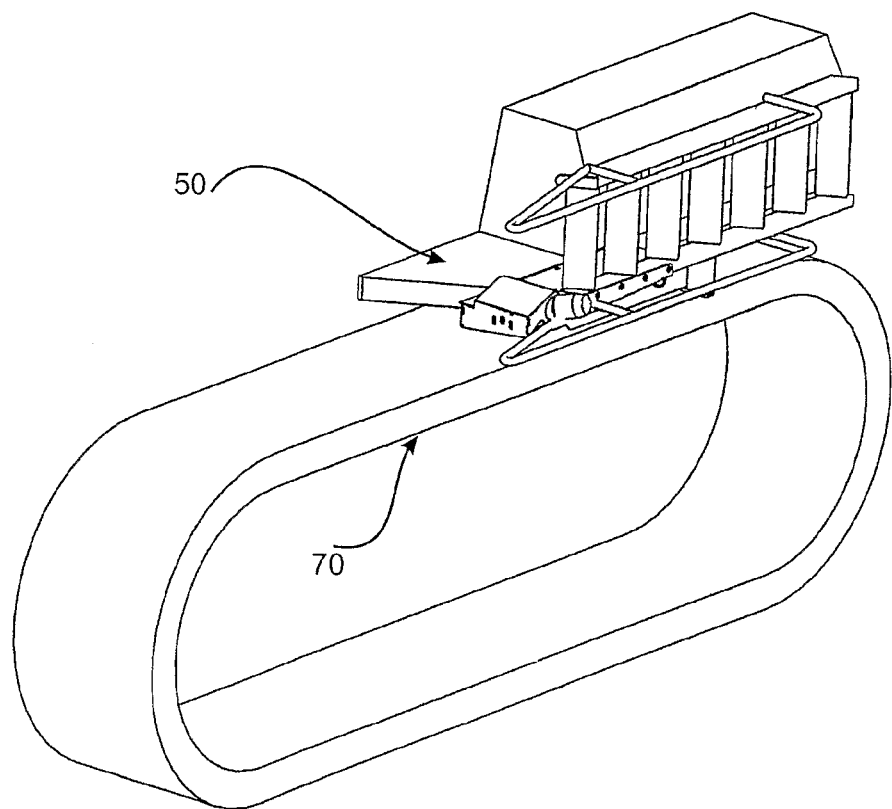
FIG. 4 illustrates the access device in retracted position.

FIG. 4 shows an example of the access device (10) in the fully retracted position and it can be seen that the access device (10) has not only rotated about the pivot (60) but also from an angle of 45° to 70° to the machine between the elevated platform (50) and ground level to a position parallel with the machine.

Figure 5:
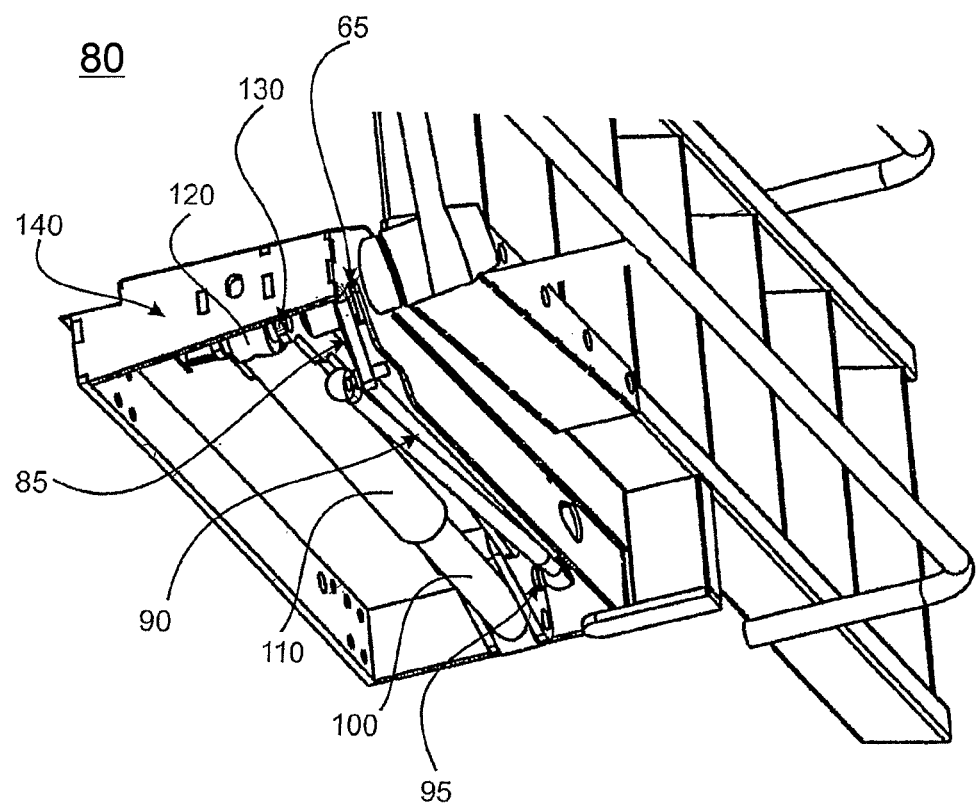
FIG. 5 illustrates a close up of the hydraulic ram and pivot of the access device.

FIG. 5 shows the hydraulic mechanism (80) used to actuate the access device (10), it can be seen from this hydraulic mechanism (80) that the access device (10) is actuated from a lever arm (85) attached to the inboard end (65) of the pivot (60). The lever arm (85) is attached to a link bar (90) connecting the lever arm (85) to a link (95). The link (95) is attached to a first end (100) of a hydraulic ram (110) with the second end (120) of the hydraulic ram (110) being attached to a fixed part (130) of the body (140) of the access device (10). The pressure used in applying the force to the hydraulic ram is specifically chosen so that in the event of the access ladder being retracted with somebody standing on it, the movement of the access ladder can be stopped without supplying significant force. This is a safety feature to limit the possibility of a person being lifted off the ground and being tipped off of the access device (20).

Figure 6:
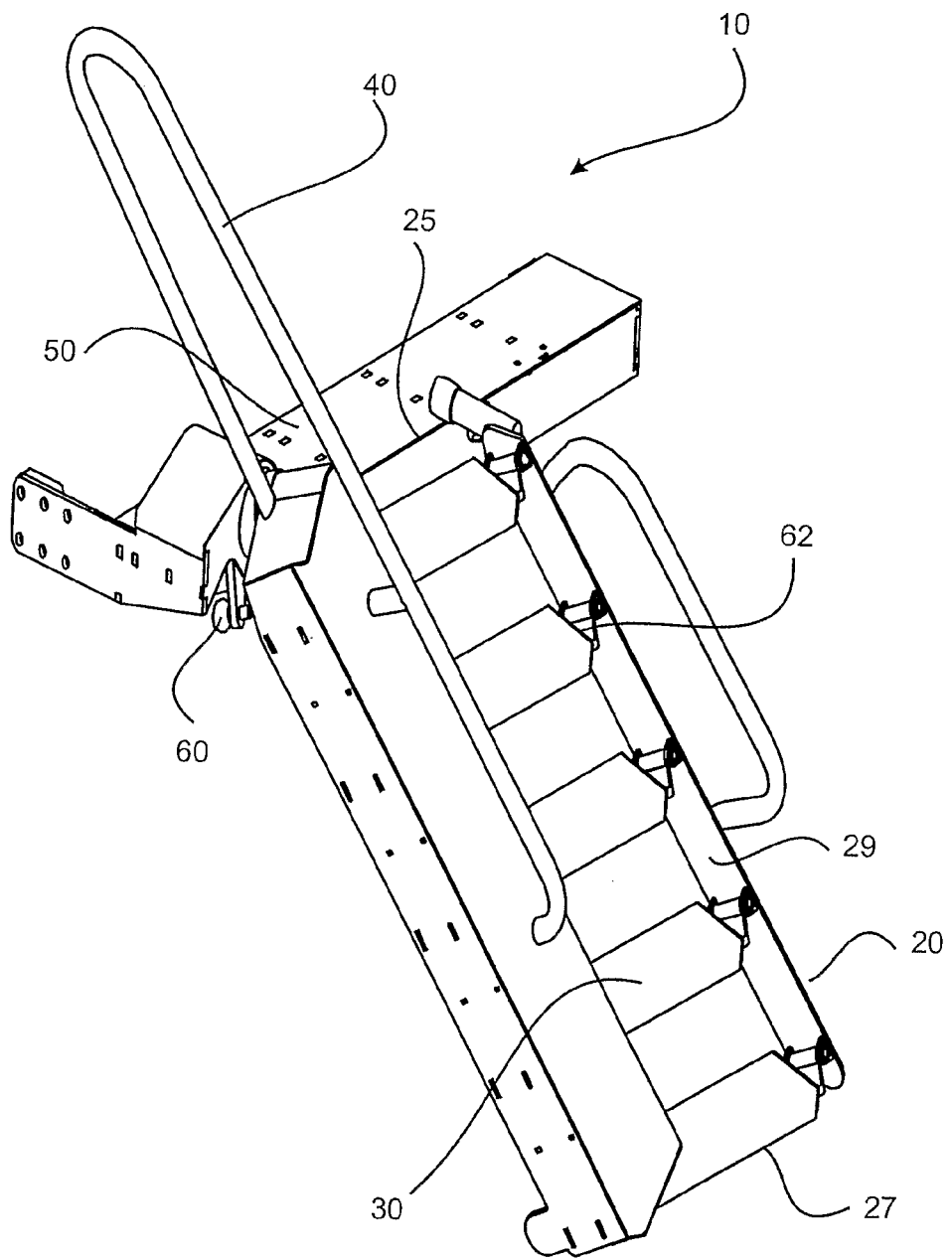
FIG. 6 illustrates an embodiment of the collapsible access device in deployed position.

Referring now to FIG. 6, the access device (10) is used in applications where an operator needs to reach the cabin, on a piece of equipment that is located some distance off the ground. The operator will therefore approach a piece of earthmoving equipment with the access device (10) in a deployed position as shown in FIG. 1 and walk up the rungs (30) to an elevated platform (50) adjacent to the operating cabin of the earthmoving equipment.

The upper end (25) of the access device (10) is connected to the elevated platform (50) of Earth Moving equipment (70) (not shown). The rungs (30) of the ladder (20) are connected to stiles (29) through a series of secondary pivots (62). The other end of the ladder near the ground level is at an angle to the horizontal and the vertical plane. The primary pivot (60) rotates to produce a compound angle with the secondary pivot (62) rotating in a different plane to produce a different compound angle. The primary pivot (60) and secondary pivots (62) are manufactured by advanced machining techniques such as wire cut machining, laser cut machining or similar techniques.

The access device (10) moves from a deployed position to a retracted position by rotation about the primary pivot (60). During retraction, the rungs (30) as well rotate about their respective secondary pivots (62) to align themselves almost parallel to horizontal plane there by collapsing the whole ladder.

When the access device (10) is retracted, it moves from a position of being at approximately 90° to the side of the machine and at an angle of between 45° and 70° from the elevated platform (50) to the surface to a position of being parallel with the machine, with the rungs (30) running at a slight angle to the horizontal thus, limiting the extent to which the access device (10) extends beyond the equipment extremes.

During the retraction of the access device (10), the primary pivot (60) movement is simultaneously complimented by the movement of the rungs (30) about the secondary pivots (62). The rungs (30) rotate about the respective secondary pivots (62) during movement of the ladder from the deployed position to a retracted position to finish up being near parallel with the stiles (29) in the final retracted position. This also allows the stiles (29) to move to a position wherein the stiles (29) are located in close proximity to each other which reduces the amount of space taken up by the access device (10). There is a relation between the primary pivot (60) angle and the secondary pivot (62) angles.

Figure 7:
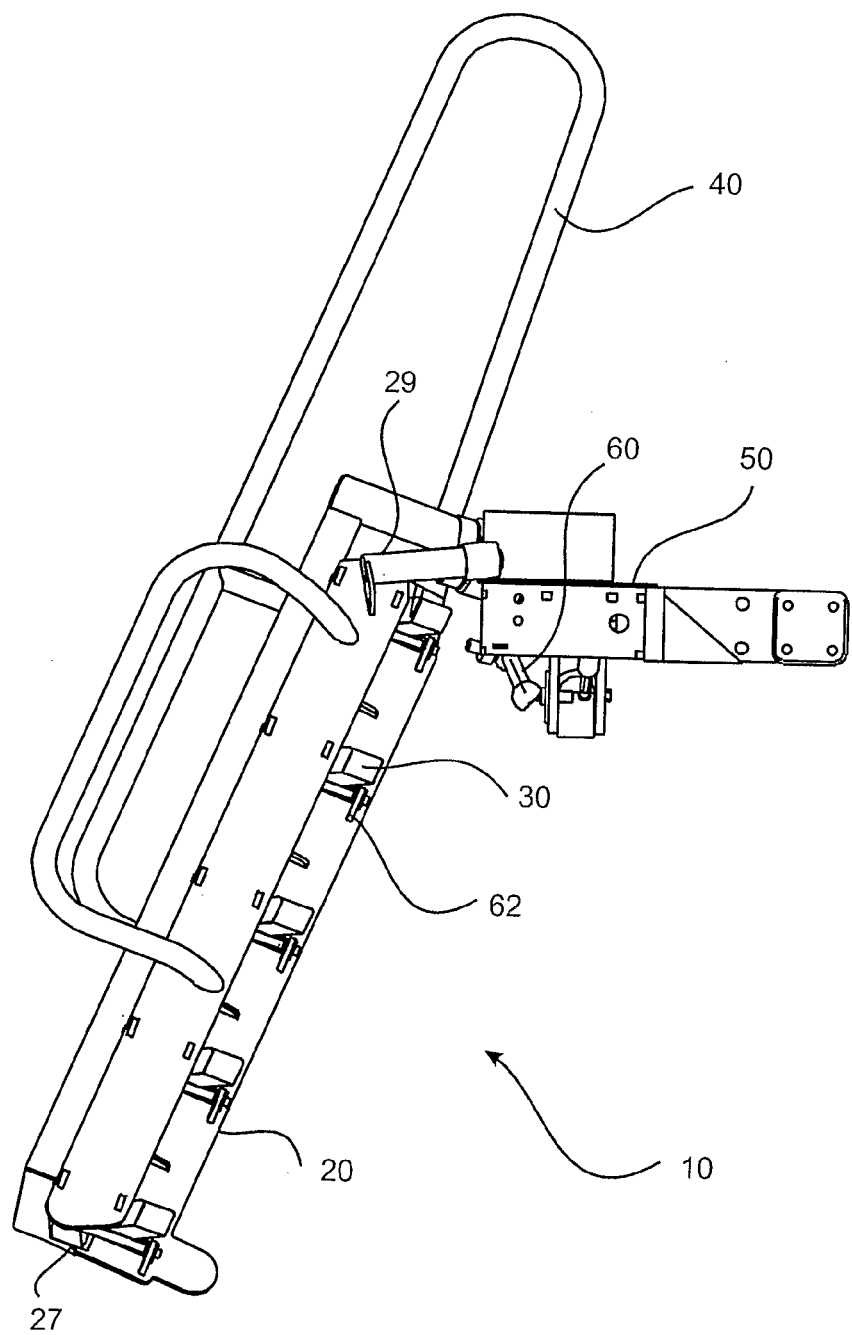
FIG. 7 illustrates an end view of an embodiment of the collapsible access device in the deployed position absent one of the rails.

FIG. 7 shows a side view of the access device (10) in the deployed position showing one of the stiles (29) and also the secondary pivots (62) at each rung (30).

Figure 8:
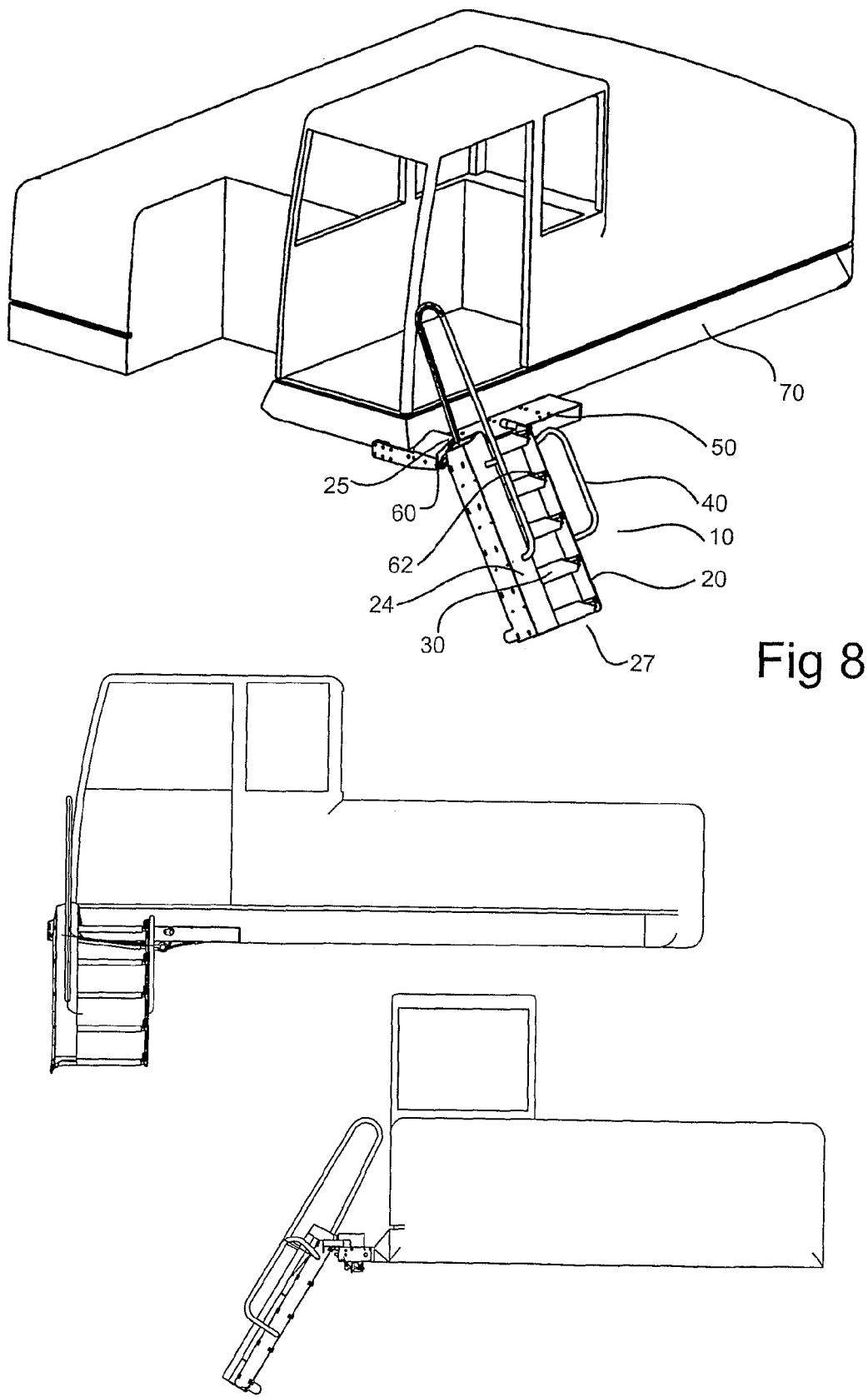
FIG. 8 illustrates an embodiment of the collapsible access device in a deployed position showing an outline of the body of a piece of earthmoving equipment.

FIG. 8 shows an example of the access device (10) with an outline of a the top section of an excavator (70), it can be seen that the access device (10) in the fully deployed position (as shown) allows for an operator to move from the ground level to an elevated platform (50) adjacent the cab of the machine.

FIG. 9 shows the access device (10) in a partially retracted position and it can be seen that the access ladder is retracting in two dimensions about a single primary pivot (60) and the rungs (30) are rotating about the secondary pivots (62), which rotate in a different plane to the main pivot (60) to finish up being near parallel with the stiles (29) in the final retracted position.

FIG. 10 shows an example of the access device (10) in the fully retracted position and it can be seen that the access device (10) has not only rotated about the primary pivot (60) but also the whole access device (10) is collapsed due to rotation of the secondary pivots (62).

The weight of the access device (10) is significantly reduced; in this particular example the weight of the access device is 140 kg where as in a conventional access device the weight would be about 200 kg.

The other significant advantage of the present invention is that it enables the access walkway to be reduced because the ladder does not interfere with cabin access when retracted. The reduction in the walkway decreases the overall weight of the walkway equipment and the leaver forces applied to the mounting point thus minimising the potential damage to the equipment when the access device is in operation. It also reduces the width of the machine when having to be transported.

The invention claimed is:

1. An earthmoving equipment access system configured and arranged to allow a person to move from ground level to an elevated position, said access system comprising:
a pivot;
a retraction mechanism; and
an access apparatus configured and arranged to support the person, the apparatus having an upper end adjacent the pivot and an opposed lower end, the access apparatus being mounted to the earthmoving equipment by the pivot, said pivot having an axis at a compound angle with respect to the earthmoving equipment and the access apparatus, the pivot axis being inclined with respect to horizontal and vertical relative to the earthmoving equipment, and the pivot axis being angled towards a front or toward a rear of the earthmoving equipment, retraction movement of the access apparatus being effected by the retraction mechanism and directed by the pivot such that during retraction of the access apparatus the lower end of the access apparatus is rotated inward and upward toward the earthmoving equipment, via the retraction mechanism from an outward deployed position of the access apparatus with respect to the earthmoving equipment to a retracted position in line with and adjacent the earthmoving equipment, the lower end of the access apparatus being at a furthest point away from the earthmoving equipment when in the outward deployed position.

2. The access system as claimed in claim 1, wherein the pivot is configured and arranged to cause the retraction mechanism to retract the access apparatus from the deployed position to the retracted position by rotating the access apparatus about the axis of the pivot in a circular arc.

3. The access system as claimed in claim 1, wherein the pivot is configured and arranged to restrict movement of the access apparatus to one plane of movement.

4. The access system as claimed in claim 1, wherein the retraction mechanism is configured and arranged to operate in a reverse mode of operation in which the retraction mechanism deploys the access apparatus from the retracted position to the deployed position, and wherein the pivot has a pivot axis inclined from horizontal and towards one of a front or rear of the earthmoving equipment.

5. The access system as claimed in claim 1 wherein the deployed position is approximately 90° to a direction of movement in which the earthmoving equipment is configured to move and at an angle relative to a vertical plane that is perpendicular to the direction of movement, and wherein the retracted position is generally parallel to the direction and movement of the earthmoving equipment, and
the retraction mechanism rotates the access apparatus about said pivot to retract the access apparatus from the deployed position to the retracted position, thus, reducing the overhang of the access apparatus beyond a perimeter of the earthmoving equipment when retracted.

6. The access system as claimed in claim 1, wherein the deployed position is generally 90° relative to the direction of movement of the earthmoving equipment and at a downward incline with respect to a ground surface.

7. The access system as claimed in claim 1, wherein the access apparatus includes at least one of a ladder or a set of stairs.

8. The access system as claimed in claim 7, wherein the deployed position is approximately 90° to a direction of movement in which the earthmoving equipment is configured and arranged to move along ground and at an angle to the ground level, the retracted position is generally parallel to the direction and movement of the earthmoving equipment, and the retraction mechanism is configured and arranged to rotate the access apparatus about said pivot to retract the access apparatus from the deployed position to the retracted position.

9. The access system as claimed in claim 7, wherein the deployed position of the access apparatus is generally 90° relative to a direction in which of movement of the earthmoving equipment is configured to move and at a downward incline with respect to the ground level.

10. An access system for earthmoving equipment, the system including
at least one pivot;
an access stair or ladder mounted to the equipment via at the least one pivot and including
first and second elongate members spaced apart on respective sides of the access stair or ladder and extending between an upper end of the access stair or ladder adjacent the earthmoving equipment and a lower end of the access stair or ladder being at a furthest point from the earthmoving equipment when deployed; and
at least one foot support extending between, and pivotably mounted to, the elongate members; and an access stair or ladder retraction mechanism configured and arranged to retract the access stair or ladder from a deployed position to a retracted position by pivoting the access stair or ladder about at least one said pivot such that the lower end of the access stair or ladder moves upward and inward toward the earthmoving equipment during retraction from the deployed position, and the access stair or ladder being configured and arranged with the retraction mechanism to collapse with the elongate members closing relative to one another by relative pivoting with respect to at least one foot support when the access stair or ladder is pivoted to a retracted position.

11. The access system as claimed in claim 10, wherein the retraction mechanism is configured and arranged to operate in a reverse mode of operation in which the retraction mechanism deploys the access stair or ladder from the retracted position to the deployed position.

12. The access system as claimed in claim 10, wherein the at least one foot support includes a series of rungs or steps arranged so as to overlay each other in the retracted position.

13. The access system as claimed in claim 12, wherein the elongate members include side members or rails arranged to overlay each other in the retracted position.

14. The access system as claimed in claim 12, wherein the access stair or ladder includes a respective secondary pivot between each of the at least one foot supports and respective elongate side members, the access stair or ladder being configured and arranged to collapse with the respective elongate side members pivoting by the secondary pivot(s) with respect to each foot support and thereby close the elongate side members toward each other in response to the retracting mechanism retracting the access stair or ladder.

15. The access system as claimed in claim 10, wherein the elongate members include side members or rails arranged to overlay each other when retracted to a generally horizontal position.

16. The access system as claimed in claim 15, wherein the access stair or ladder includes a respective secondary pivot between each of the at least one foot supports and respective elongate side members, the access stair or ladder being configured and arranged to collapse with the respective elongate side members pivoting by the secondary pivot(s) with respect to each foot support and thereby close the elongate side members toward each other in response to the retracting mechanism retracting the access stair or ladder.

17. The access system as claimed in claim 10, wherein the at least one foot support includes at least two foot supports, further including a secondary pivot between each of the foot supports and respective elongate side members, the secondary pivot being configured and arranged to facilitate movement of the elongate members towards one another and therein collapse the stair or ladder when retracted.

18. The access system as claimed in claim 17, wherein the retraction mechanism is configured and arranged to operate in a reverse mode of operation in which the retraction mechanism deploys the access stair or ladder from the retracted position to the deployed position.

19. A method of retracting an earthmoving vehicle access stairs or ladder, including the method step of rotating the access ladder or stairs about a pivot having an axis at a compound angle with respect to the vehicle, the axis inclined from horizontal and vertical relative to the earthmoving vehicle, and inclined towards a front or rear of the vehicle and non-parallel to the access ladder or stairs, the access stairs or ladder being rotated during retraction from an outwardly and downwardly extending position with a lower end of the access stairs or ladder being at a furthest point from the earthmoving vehicle when in the outwardly and downwardly extending position and moving upward and toward the earthmoving vehicle from a fully deployed position with respect to at least part of the vehicle to a retracted position with the access stairs or ladder substantially adjacent and aligned with respect to the earthmoving vehicle.

20. The method of claim 19, wherein a pivot axis extending along a length of the pivot is at an inclined angle with respect to a horizontal plane, the method further including rotating the access stairs or ladder along a plane tangent to the pivot axis.

21. The method as claimed in claim 19, further including the step of collapsing the access ladder or stairs in width between deployed and retracted positions.

22. The method as claimed in claim 21, wherein the step of collapsing the ladder or stairs further includes pivoting at least one foot support with respect to elongate side members using a secondary pivot attaching the respective at least one foot support to each elongate side member, and collapsing the elongate members toward one another.

23. The method as claimed in claim 21, wherein the access ladder or stairs includes at least one foot support pivotably connected to elongate side members, and wherein the step of collapsing the ladder or stairs further includes bringing the elongate side members closer together and pivoting the at least one foot support relative thereto such that the elongate side members overlay the at least one foot support when in the retracted position.

24. The method as claimed in claim 23, wherein the step of collapsing the ladder or stairs further includes pivoting the at least one foot support with respect to the elongate side members using a secondary pivot attaching the respective at least one foot support to each elongate side member.

25. An earthmoving equipment access system configured and arranged to allow a person to move from ground level to an elevated position on the earthmoving equipment, said access system comprising:
    a pivot having an axis at a compound angle with respect to the earthmoving equipment, the pivot axis being inclined with respect to horizontal and vertical relative to the earthmoving equipment, and the pivot axis being angled towards a front or towards a rear of the earthmoving equipment and non-parallel to access means, for supporting the person, mounted to the earthmoving equipment by the pivot; and
    a retraction mechanism configured and arranged with the pivot and the access means to retract the access means about the axis of the pivot from a downwardly deployed position to a retracted position, movement of the access means being directed by the pivot such that the access means is retracted by the retraction mechanism from the deployed position with the access means extending from the pivot downward and outward to a lower end of the access means with respect to the earthmoving equipment, through an arc of retraction bringing the lower end upward and inward toward the earthmoving equipment from a furthest point away from the earthmoving equipment when in the deployed position to a retracted position in line with and adjacent the earthmoving equipment.

26. An access system for earthmoving equipment, the system comprising:
    a pivot having an axis at a compound angle with respect to the earthmoving equipment, the pivot axis being inclined with respect to horizontal and vertical, and the pivot axis being angled towards a front or towards a rear of the earthmoving equipment;

an access stair or ladder mounted to the earthmoving equipment via the pivot, and including first and second elongate members spaced apart on respective sides of the access stair or ladder and at least one foot support extending therebetween, wherein said at least one foot support is pivotably mounted to the elongate members; and an access stair or ladder retraction mechanism configured and arranged to retract the access stair or ladder from a deployed position to a retracted position by pivoting the access stair or ladder about said pivot with a deployed lower end of the access stair or ladder rotating upward and toward the earthmoving equipment from a furthest point away from the earthmoving equipment when in the deployed position, and wherein the access stair or ladder is configured and arranged to collapse with the elongate members closing relative to one another by relative pivoting with respect to the at least one foot support when pivoted to the retracted position.

\* \* \* \* \*